Patented Dec. 15, 1942

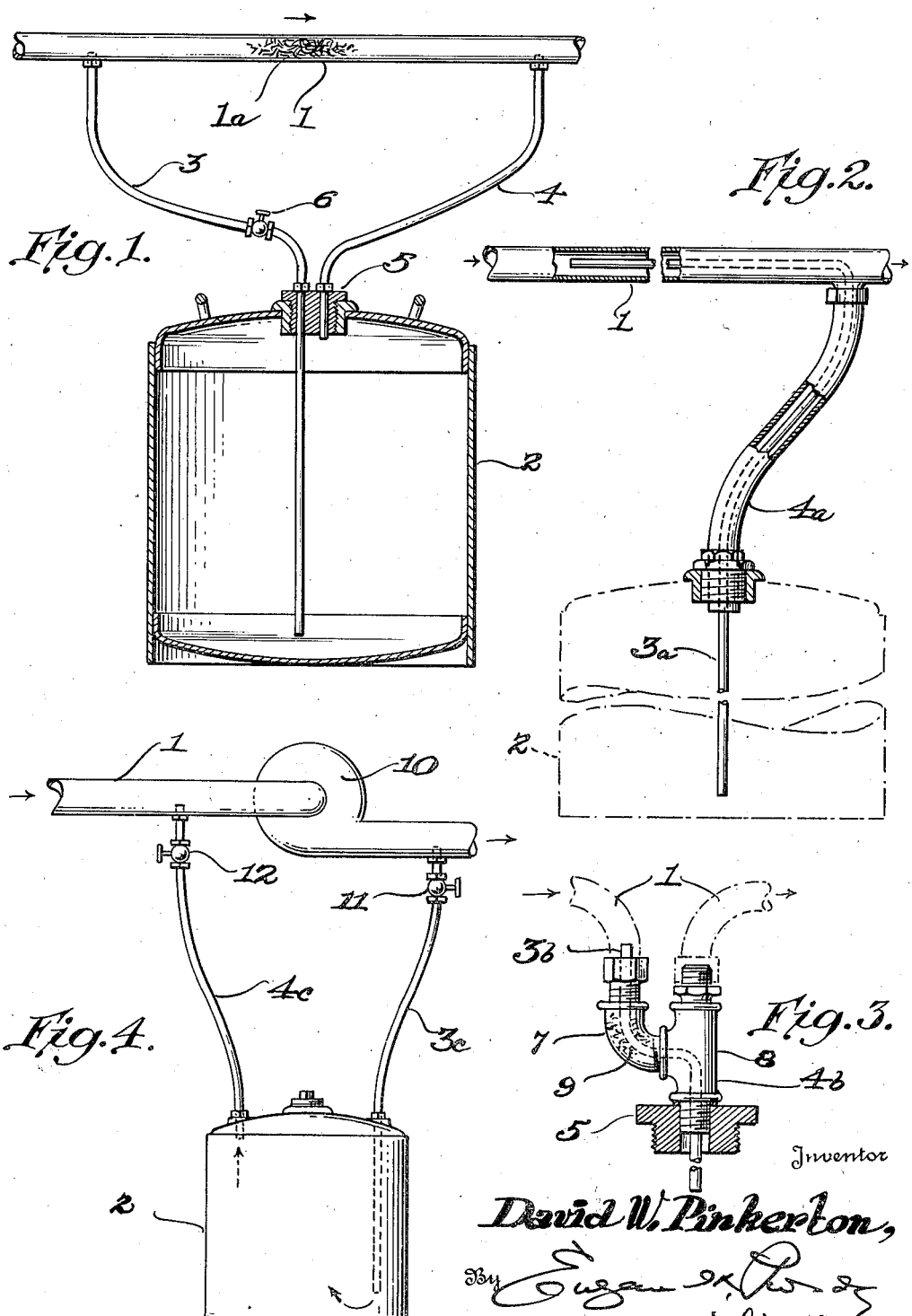
Dec. 15, 1942.    D. W. PINKERTON    2,304,846
FERTILIZING APPARATUS
Filed Oct. 29, 1940

2,304,846

UNITED STATES PATENT OFFICE 2,304,846

FERTILIZING APPARATUS

David W. Pinkerton, Eustis, Fla.

Application October 29, 1940, Serial No. 363,346

1 Claim. (Cl. 299—84)

This invention relates to fertilizing apparatus and more particularly to apparatus for supplying plant foods to the water used for irrigating or sprinkling lawns, shrubbery, gardens, orchards and the like.

An important object of my invention is to provide a simple and inexpensive fertilizer distributing tank of closed construction adapted to be conveniently connected in by-pass relation with an irrigating conduit (such as a pipe or hose) and being so constructed and arranged that the stream of water diverted from the conduit is caused to flow under pressure through the tank and carry off in solution the nutrient salts contained therein.

Another object of my invention is to provide a fertilizer distributing tank of the above character which is so constructed and arranged that the by-passed stream of water flows into the tank adjacent its bottom and flows out adjacent its top, thereby preventing the system from becoming air-locked by reason of the air, carried in solution or as bubbles, becoming entrapped within the tank and building up pressure therein.

Still another object of my invention is to provide a fertilizer distributing tank of the above character which permits the nutrient salts to be introduced into the irrigating water as a solution of uniform, predetermined concentration best adapted to the individual requirements of the soil being watered, while avoiding the danger of over-stimulation or burning the roots of the plants.

Other objects and advantages will be apparent from the following detailed description of a preferred embodiment of the invention, reference being had to the annexed drawing in which:

Figure 1 is a vertical cross-sectional view of one form of fertilizer distributing tank connected in circuit with an irrigating conduit;

Figure 2 is a vertical cross-sectional view of a modified form of distributing tank;

Figure 3 is a vertical cross-sectional view of a modified form of connection between the irrigating conduit and distributing tank; and Figure 4 illustrates still another form of distributing tank connected to the irrigating conduit upon opposite sides of a centrifugal pump.

Excellent results have been accomplished within the last few years by the practice of feeding plants exclusively in their water supply. This hydroponic method of fertilization, however, has been confined almost wholly to large scale commercial operations because of the specialized technique which heretofore has been required to properly introduce the plant foods into the irrigating water in uniform and controlled concentrations. Accordingly, I have devised a fertilizer distributing apparatus of simple and inexpensive construction which is especially suited to the needs of the average home owner and which may be readily connected in circuit with a sprinkling hose or irrigating pipe coupled to the city water supply.

One form of my invention is shown in Fig. 1 wherein 1 represents an irrigating conduit leading from a souce of water supply and adapted to deliver water to a lawn or garden, for example. Arranged below and connected in circuit with the conduit is a fertilizer distributing tank 2, preferably of metal, including an inlet pipe 3 leading from the conduit to a level adjacent the bottom of the tank and an outlet pipe 4 extending from the top of the tank back to the conduit, the inlet pipe, tank and outlet pipe constituting a by-pass for diverting a stream of water from the conduit through the tank.

The tank 2 is entirely closed but is provided at its top with a removable plug 5 closing an opening through which a supply of plant food is introduced into the bottom of the tank before the latter is connected to the irrigating conduit. This plant food is of a composition which is highly soluble in water and is selected with regard to the nature of the soil and the requirements of the plants to be irrigated. Both the inlet and outlet pipes extend through openings in the plug and these pipes join the conduit 1 at spaced points along the conduit so that the inlet pipe leads off from the conduit at a point of higher water pressure and the outlet pipe leads into the conduit at a point of lower water pressure, representing the pressure drop along the conduit. A valve 6 is interposed in the inlet pipe for regulating the flow of diverted water through the tank.

The operation of this apparatus is as follows: By adjusting the valve 6 the volume of water by-passed through the tank 2 may be controlled. This diverted stream of water enters the bottom of the tank from the inlet pipe 3 from which it passes upwardly through the supply of plant food within the tank, dissolving a part of the very soluble salts. So long as some of the plant food remains in solid form the tank will be filled with a saturated solution of such salts. While a stream of saturated solution is continually flowing from the tank to the conduit 1 through the outlet pipe 4, this solution is being replenished by the incoming stream of fresh water from the pipe 3 which carries more plant food into solution.

Because the outlet pipe 4 communicates with the tank at its top, there is no tendency for air carried into the tank in the form of bubbles or in solution in the water to become trapped within the top of the tank. Such entrapment would seriously interfere with the operation of the apparatus by creating back-pressure or "air lock," restricting the flow of water through the tank. Furthermore such entrapped air would prevent the uniform flow of solution from the tank, by reason of the cushion created by such air which, under the influence of varying pressures in the conduit (a common condition in city water supply systems), a pumping or pulsating action would be produced causing a variable flow of solution into the conduits. The heavy impurities, such as bits of rock, shells, etc., contained in the fertilizer are deposited in the bottom of the tank and are not carried over into the irrigating conduit where they would tend to accumulate and eventually clog the conduit.

The quantity of solution introduced into the conduit corresponds to the volume of water diverted into the tank from the conduit and also to the rate of flow through the tank. These factors depend upon the pressure drop between the points of connection of the inlet and outlet pipes with the conduit, resulting from skin friction and turbulence, and by the extent of opening of the valve 6. If desired, the size of the inlet pipe 3 may be suitably chosen so as to insure the desired flow, thus eliminating the necessity for the valve. A small amount of steel wool or other current-impeding material 1a may be introduced into the conduit 1 between the inlet and outlet pipes in order to create turbulence and increase the pressure differential between these pipes.

In the modification of the apparatus shown in Fig. 2, the tank 2 is indicated in phantom outline, and only the connections with the conduit 1 are shown. In this form of the device the inlet pipe 3a is substantially smaller in diameter than the outlet pipe 4a and extends, in spaced relation, within the latter. The outlet pipe 4a leads from the top of the tank to the conduit, while the inlet pipe 3a has its forward end section projecting axially within the conduit 1 forwardly of the point of connection of the outlet pipe therewith. The terminal section of the inlet pipe extends downwardly to a point adjacent the bottom of the tank.

Because the forward end of the inlet pipe 3a extends to a point of higher pressure within the conduit, water is diverted through this inlet pipe into the bottom of the tank containing the supply of plant food, and the saturated solution flows from the tank upwardly through the outlet pipe 4a which connects with the conduit at a point of lower pressure. Thus, water will be by-passed through the tank in substantially the same manner as described in connection with the embodiment of Fig. 1.

In the tank connection illustrated in Fig. 3, a bend in the conduit 1 is formed by means of an elbow 7 and a vertically disposed T 8, both being inserted as a detachable section in direct circuit with the conduit as shown in the figure. An inlet pipe 3b of substantially smaller diameter than the elbow and T extends interiorly thereof from a point on one side of the bend to the bottom of the tank (not shown). The tank outlet is defined by the lower end 4b of the T which is screw-threaded into the plug 5 which closes the filling opening in the top of the tank.

When connection is initially made with the conduit 1 water from this conduit floods the tank, following which the principal flow of irrigating water is downwardly through the elbow 7 and upwardly through the T 8. However, a small stream of water is diverted by the inlet pipe 3b into the bottom of the tank and this displaces an equal volume of solution upwardly through the outlet section 4b of the T into the irrigation line. Under certain conditions it may be found desirable to insert a small amount of steel wool or a current-impeding material 9 in the elbow 7 surrounding the inlet pipe to increase the turbulence of the water passing therethrough and accordingly regulate the volume of water diverted through the inlet pipe.

In the form of the invention of Fig. 4, the inlet-pipe 3c and the outlet pipe 4c are connected to the conduit 1 upon the discharge and intake sides, respectively, of a centrifugal pump 10. The inlet pipe leads downwardly through the tank 2 to a point adjacent its bottom, while the outlet pipe leads off from the top of the tank, the two pipes being located upon opposite sides of the tank in order to insure a longer path of travel of the water through the tank. Valves 11 and 12 are provided in the inlet and outlet pipes for controlling the volume of diverted water passing therethrough and for shutting off the tank completely to allow refilling without interrupting the operation of the pump.

Since the pressure is greater in the conduit 1 upon the discharge side of the pump and less upon the intake side, a circulation will take place through the tank, as indicated by the arrows.

It will be apparent from the foregoing description that I have provided a simple and inexpensive fertilizer distributing tank of closed type which permits the addition of plant foods to the irrigating water in uniform and controlled amounts such as is necessary to attain the best results by the hydroponic method of fertilization. In any of the above forms of apparatus current-impeding material such as steel wool may be inserted in the irrigating line, as has been previously explained, for the purpose of increasing the resistance and hence the pressure drop between the inlet and outlet pipes. It is also within the contemplation of the present invention to include as a part of the apparatus the section of conduit between the inlet and outlet lines so that such conduit section may be inserted in the irrigating line as a unitary part thereof.

Manifestly various other changes in arrangement and design may be made in the forms of apparatus herein disclosed without departing from the spirit or essential characteristics of my invention.

I claim:

A fertilizer distributing apparatus adapted to be connected in by-pass relation with an irrigating conduit, said apparatus comprising a closed tank having an opening for the introduction therein of a supply of soluble plant food, a closure for said opening, a conduit section adapted to be connected in direct circuit with the irrigating conduit, a pump located in said conduit section, an inlet pipe and outlet pipe extending between said conduit section and the tank, said inlet tube being located on the discharge side of the pump and leading to adjacent the bottom of the tank and said outlet tube being located on the intake side of the pump and leading from adjacent the top of the tank, and means for controlling the flow of water through the tank.

DAVID W. PINKERTON.